United States Patent [19]

Gephardt et al.

[11] Patent Number: 5,615,207
[45] Date of Patent: Mar. 25, 1997

[54] SIDE BUS TO DYNAMICALLY OFF LOAD MAIN BUS

[75] Inventors: Douglas D. Gephardt; Brett B. Stewart; Rita M. Wisor; Drew J. Dutton, all of Austin; Steven L. Belt, Pflugerville, all of Tex.

[73] Assignee: Advanced Micro Devices, Inc., Sunnyvale, Calif.

[21] Appl. No.: 482,045

[22] Filed: Jun. 7, 1995

[51] Int. Cl.$^6$ .................................................. H04L 12/46
[52] U.S. Cl. .......................................... 370/237; 370/402
[58] Field of Search .............................. 370/14.16, 16.1, 370/17, 54, 85.2, 85.6, 85.9, 85.12, 85.13, 85.14

[56] References Cited

U.S. PATENT DOCUMENTS

| 4,847,837 | 7/1989 | Morales et al. | 370/16 |
| 4,872,162 | 10/1989 | Tanaka et al. | 370/85.12 |
| 5,434,863 | 7/1995 | Ohishi et al. | 370/85.13 |

*Primary Examiner*—Melvin Marcelo
*Attorney, Agent, or Firm*—Foley & Lardner

[57] ABSTRACT

A data communication system includes an express bus, a plurality of local buses, and a plurality of local/express bridges, each local/express bridge connecting a corresponding local bus to the express bus. A plurality of local/local bridges each connect two corresponding local buses. The plurality of local buses and the plurality of local/local bridges comprise a local path. Also provided is a method of communicating information from a sending communication device to a target communication device, comprising the steps of a) determining if the target communication device is on a local bus corresponding to the sending communication device, b) transferring the information from the sending communication device to the target communication device on the local bus corresponding to the sending communication device if the result of step a) is that the target communication device is on the local bus corresponding to the sending communication device, c) transferring the information from the sending communication device to an express bus if the result of step a) is that the target communication device is not on the local bus corresponding to the sending communication device, d) transferring the information from the express bus to a local bus corresponding to the target communication device, and e) transferring the information from the local bus corresponding to the target communication device to the target communication device.

11 Claims, 5 Drawing Sheets

SIDE BUS TO DYNAMICALLY OFF LOAD MAIN BUS

BACKGROUND OF THE INVENTION

The invention relates to data communication between a plurality of communication devices. Present data communication structures provide for a sending communication device to send information, such as a packet of data, to a target communication device over a data bus.

Alternatively, as described in a co-filed application No. 08/482,046, entitled Information Flow Through Alternate Data Buses, incorporated herein by reference, the sending communication device and target communication device can be connected to two data buses, one data bus being for the transfer of random access data, and the other data bus being for the transfer of flow data.

To facilitate data transfer, high speed data buses have been developed. As a result, data can be rapidly transferred between devices connected to the data bus. However, if more than one communication device is attempting to send data on a given data bus, for example, a high speed data bus, the contention between the devices will cause at least one of the devices to wait for access to the data bus until the other device or devices have completed sending their data over the data bus. If this wait is too long, the target device, for which the data from the waiting device is targeted, may experience operational degradations or failure caused by the delay.

Alternatively, sending communication devices may overload a target device by sending too much data to the target device. This can occur, for example, when a given sending device is granted too much access to the data bus, and attempts to send a large quantity of data to a single target device in a short period of time. Another example of overloading a target device is when a plurality of devices are granted access to the bus in close time proximity, and all of these devices are attempting to transfer data to the same target device.

SUMMARY OF THE INVENTION

Accordingly, it is an object of the present invention to provide a data bus structure which includes a side bus for use in dynamically off-loading data transfers from a main bus. The side bus structure can be used when a sending device cannot get timely access to the main bus, and therefore provides an alternative data path for data from the sending device to travel towards the corresponding target device.

Further, the side bus structure can enable a sending device to transmit the data so that the sending device can return to its main mission, instead of slowing down its main mission while it waits for access to the main bus.

Further, the side bus structure can be used to slow down incoming data to avoid overloading a target device, by providing a slower route for data to proceed to the target device.

It is therefore an object of the invention to provide a data communication system comprising an express bus, a plurality of local buses, and a plurality of local/express bridges, each connecting a corresponding local bus to the express bus.

It is a further object of the invention to provide a plurality of local/local bridges, each connecting two corresponding local buses. The plurality of local buses and the plurality of local/local bridges can comprise a local path.

It is a further object of the invention to provide a plurality of data communication devices, each data communication device being connected to an associated one of the local buses. A first subset of the plurality of data communication devices can comprise data communication devices which are each connected to an associated one of the local buses, and a second subset of the plurality of data communication devices can comprise data communication devices which are connected to the express bus.

It is also an object of the invention to provide a method of communicating information from a sending communication device to a target communication device, the method comprising the steps of a) determining if the target communication device is on a local bus corresponding to the sending communication device, and b) transferring the information from the sending communication device to the target communication device on the local bus corresponding to the sending communication device if the result of step a) is that the target communication device is on the local bus corresponding to the sending communication device.

It is a further object of the invention to add to the above method by providing steps c–e which comprise c) transferring the information from the sending communication device to an express bus if the result of step a) is that the target communication device is not on the local bus corresponding to the sending communication device, d) transferring the information from the express bus to a local bus corresponding to the target communication device, and e) transferring the information from the local bus corresponding to the target communication device to the target communication device.

It is a further object of the invention to provide the steps of b1) determining if an express bus is free if the result of step a) is that the target communication device is not on the local bus corresponding to the sending communication device, b2) transferring the information from the local bus corresponding to the sending communication device to another local bus if the result of step b1) is that the express bus is not free, and c) transferring the information from the sending communication device to the express bus if the result of step b1) is that the express bus is free.

It is a further object of the invention to provide the steps of b2a) determining if the target communication device is on the other local bus if the result of step b2) is that the information is transferred to the other local bus, and b2b) transferring the information from the other local bus to the target communication device if the result of step b2a) is that the target communication device is on the other local bus.

It is a further object of the invention to provide the steps of b2c) transferring the information from the other local bus to the express bus if the result of step b2b) is that the target communication device is not on the other local bus, b2d) transferring the information from the express bus to a local bus corresponding to the target communication device if the result of step b2c) is that the information is transferred to the express bus, and b2e) transferring the information from the local bus corresponding to the target communication device to the target communication device if the result of step b2d) is that the information is transferred to the local bus corresponding to the target communication device.

It is a further object of the invention to provide a method comprising the steps of: b1) determining if an express bus is free if the result of step a) is that the target communication device is not on the local bus corresponding to the sending communication device, b2) determining a wait time until the express bus will be free if the result of step b1) is that the express bus is not free, b3) comparing the wait time determined in step b2) to a maximum acceptable wait time, b4) transferring the information from the local bus corresponding to the sending communication device to another local bus if the result of step b3) is that the wait time exceeds the maximum acceptable wait time, b5) delaying for the wait time and transferring the information to the express bus upon lapse of the wait time if the result of step b3) is that the wait time does not exceed the maximum wait time, and c) transferring the information from the sending communication device to the express bus if the result of step b1) is that the express bus is free.

BRIEF DESCRIPTION OF THE DRAWINGS

These and other objects of the invention will be apparent to one skilled in the art upon review of this specification and the accompanying drawings, wherein.

DETAILED DESCRIPTION

Figure 1:
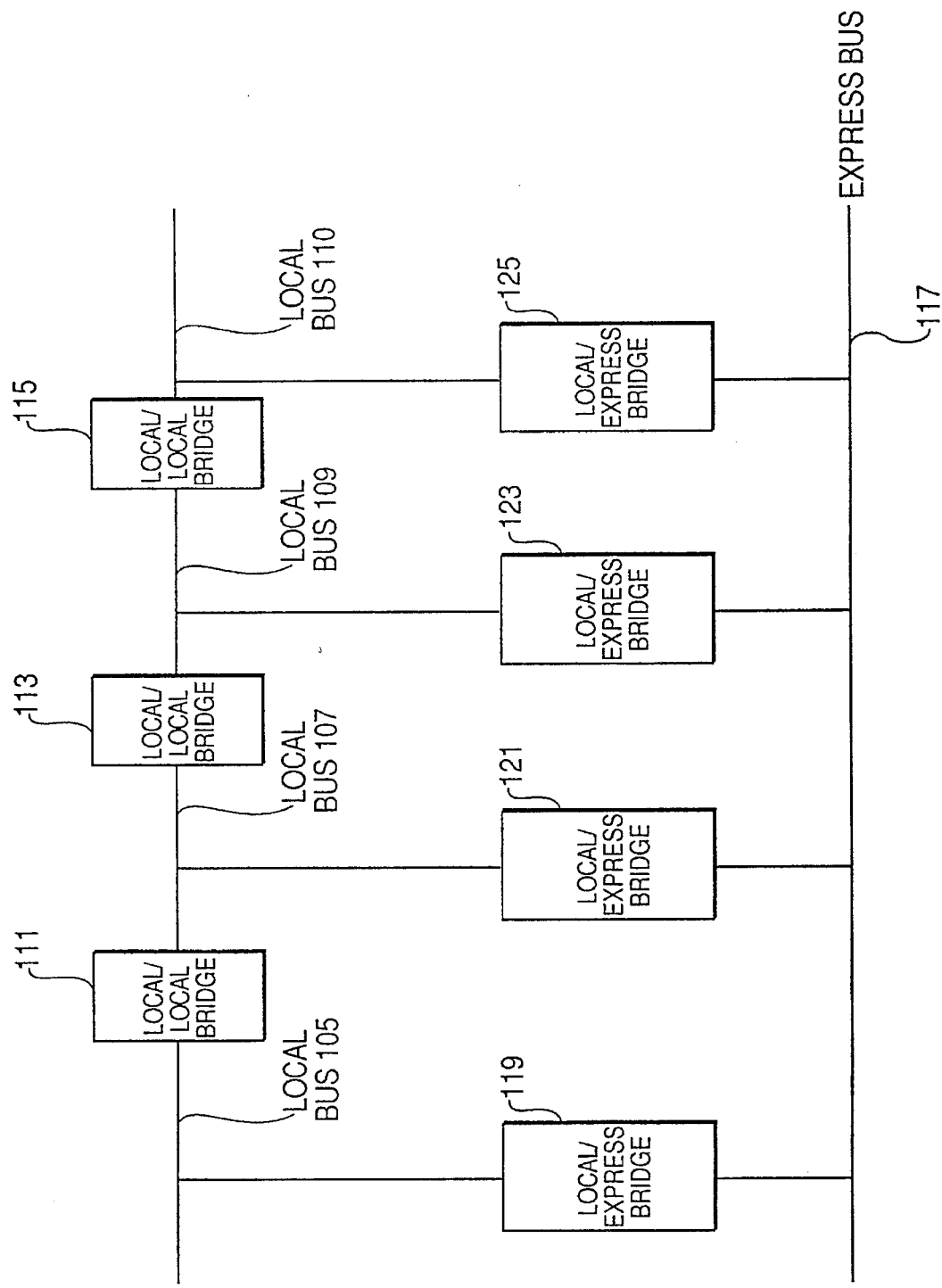
FIG. 1 shows a bus structure according to the invention.

FIG. 1 shows a bus structure in accordance with the invention. Local buses 105, 107, 109 and 110 are interconnected by local/local bridges 111, 113 and 115. Express bus 117 is connected to local buses 105, 107, 109 and 110 by local/express bridges 119, 121, 123 and 125 respectively.

Figure 2:
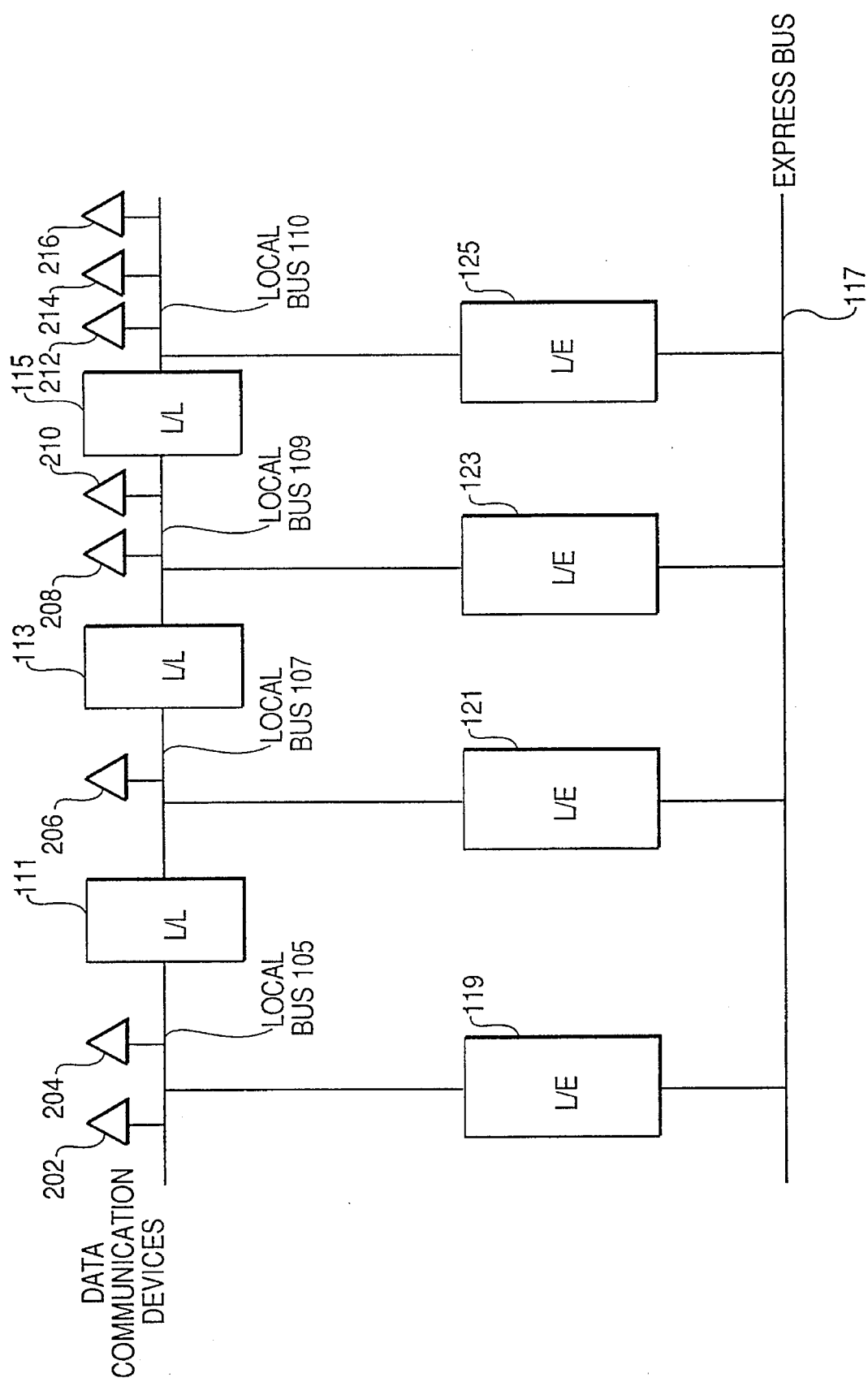
FIG. 2 shows the bus structure of FIG. 1, further comprising communication devices connected to the local buses.

FIG. 2 shows the bus structure of FIG. 1, with data communication devices connected to the local buses. Data communication devices 202 and 204 are connected to local bus 105. Similarly, data communication device 206 is connected to local bus 107. Data communication devices 208 and 210 are connected to local bus 109, and data communication devices 212, 214 and 216 are connected to local bus 110.

Figure 3:
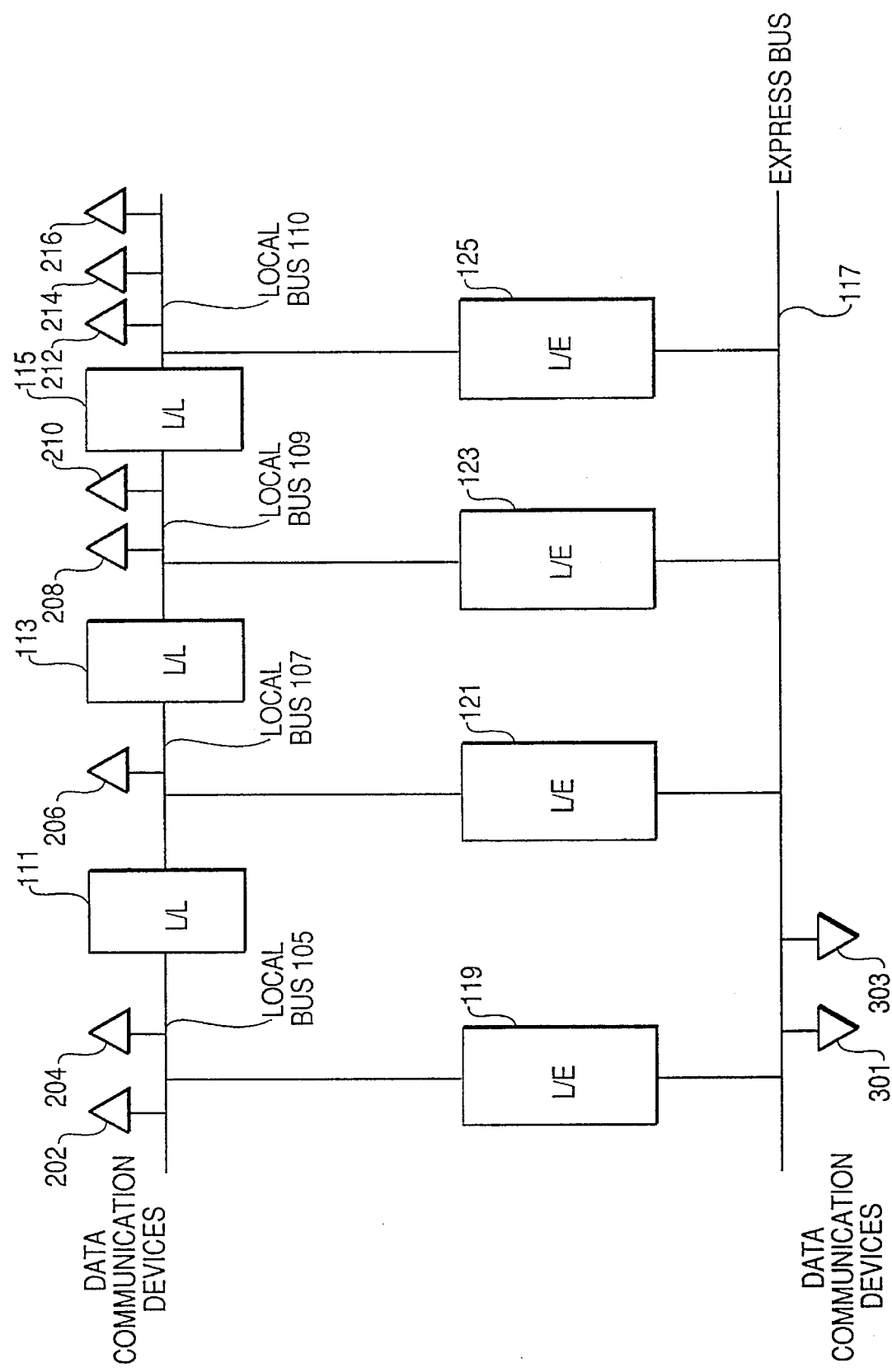
FIG. 3 shows the bus structure of FIG. 2, further comprising communication devices connected to the express bus.

FIG. 3 shows the bus structure of FIG. 2, further comprising data communication devices 301 and 303 connected to express bus 117. Using the structure of FIG. 3, as well as the flow diagram of FIG. 4, a first example of a method of operating the bus structure of the invention will be described.

Presume data communication device 202 has information to be sent to data communication device 210. In this scenario, data communication device 202 is the sending communication device and data communication device 210 is the target communication device.

At step 402, a determination is made as to whether the target communication device (210) is on the same local bus (105) as the sending communication device (202). The system can be configured such that this determination is made by any one of a plurality of devices. For example, an external bus controller can be connected to local bus 105. Alternatively, each data communication device connected to local bus 105 can include a processor and a memory in which is stored an identifier of each of the communication devices connected to the local bus. Alternatively, a message can be sent out on bus 105 polling the communication devices connected thereto in order to determine if there is a match with an identifier of the target communication device.

In any case, if the answer to the query of step 402 is YES, the information is transferred via the local bus (step 404). In the case of the present example, however, the answer is NO since sending communication device 202 is on local bus 105, while target communication device 210 is on local bus 109. Thus, at step 406, the information is sent via express bus 117.

To carry out the process of sending the information via express bus 117, the information travels from sending communication device 202 over local bus 105 to local/express bridge 119. The information then travels over express bus 117 to local/express bridge 123. The information then travels from local/express bridge 123 to local bus 109, where it passes to target communication device 210.

Figure 5:
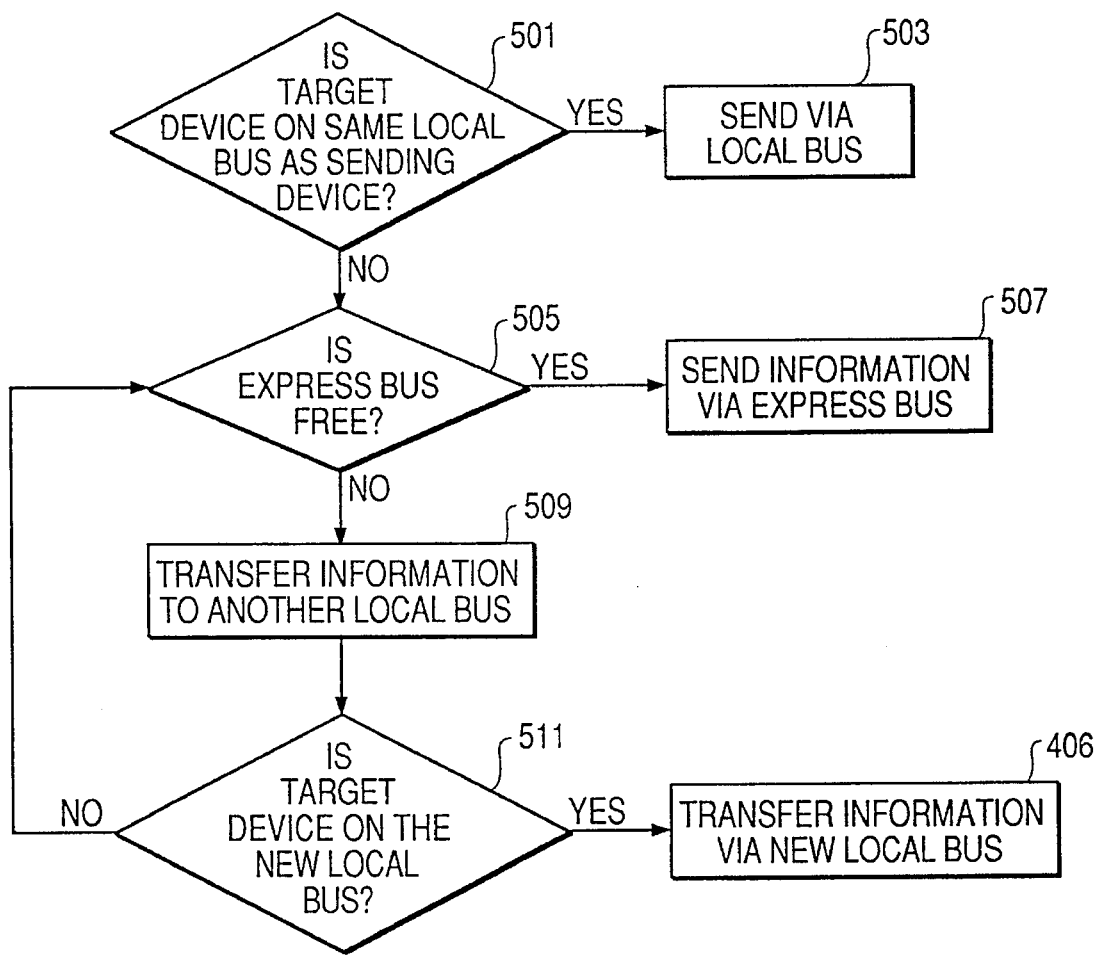
FIG. 5 shows an operational flow diagram of a second operational embodiment of the invention.

FIG. 5 shows a second example of the operation of the bus structure of the invention. Again, referring to the structure of FIG. 3, we presume that data communication device 202 is the sending communication device and data communication device 210 is the receiving communication device. The first step, 501, is again to determine if the target communication device is on the same local bus as the sending communication device. If that were the case, via step 503, the information would be transferred via the common local bus.

Since the target communication device is not on the same local bus as the sending communication device, the system proceeds to step 505, where a determination is made as to whether the express bus is free. This determination can be made, for example, by an external bus arbiter connected to express bus 117. If the answer is YES, then via step 507 the information is sent by way of the express bus, as described above with respect to step 406.

If the answer to step 505 is that the express bus is not free, then the information is transferred to another local bus, as shown in step 509. This transfer will be through a local/local bridge connecting the local bridge of the sending communication device to another local bridge. In the present example, this transfer will occur via local/local bridge 111 to local bus 107. At step 511, a determination is then made as to whether the target communication device is on the new local bus. If so, as shown in step 513, the information is transferred to the target communication device via the new local bus. In our example the target communication device is on local bus 109. Thus, the result of step 511 is that the target communication device is not on the new local bus and the system returns to step 505 to see if the express bus is free. Alternatively, as a result of a NO answer to the inquiry of step 511, the system can automatically proceed to the express bus, causing the information to wait if the express bus is not free.

As the system proceeds to step 505, the system can maintain a record as to which local buses have previously held the information. This information can be stored, for example, in a series of flags within a portion of the information to be transferred. As a result of a transfer, the transferring bus or local/local bridge can then update this flag information.

Thus, if the express bus is once again busy, a transfer will occur to a local bus which has not yet held the information. In our example, therefore, a subsequent local/local transfer will be via local/local bridge 113 to local bus 109, to which the target communication device is attached. As a result of the express bus being busy for two successive inquiries, therefore, the information transfer occurs along a local path comprising local buses 105–109 and local/local bridges 111 and 113.

Figure 6:
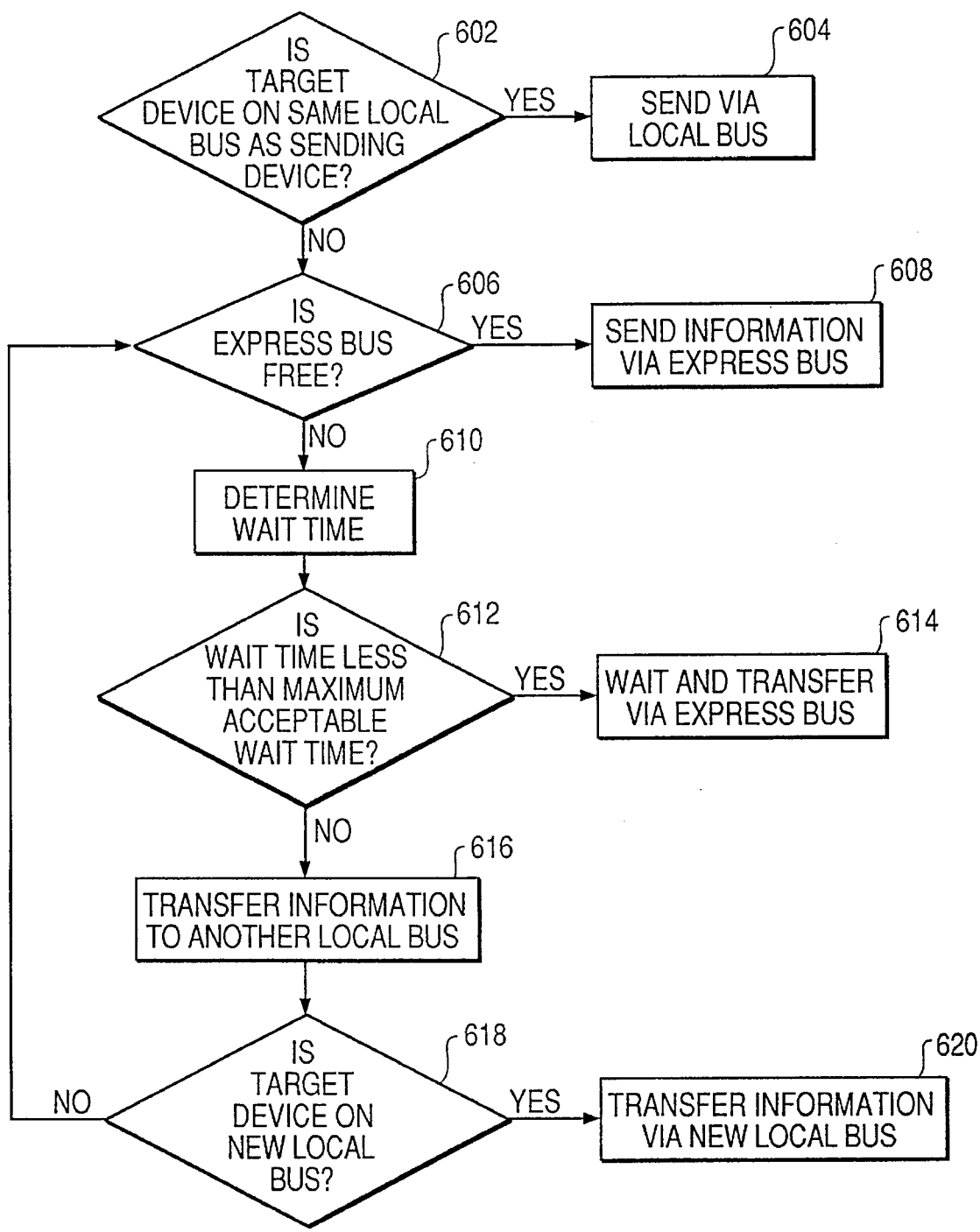
FIG. 6 shows an operational flow diagram of a third operational embodiment of the invention.

FIG. 6 shows a third example of a method of operating the bus structure of the invention. Here, in a manner similar to the earlier described methods, a determination is first made as to whether the target communication device is on the same local bus as the sending communication device in step 602. If so, the information is transferred to the target communication device via the local bus as shown in step 604.

If the target communication device is not on the same local bus as the sending communication device, at step 606 an inquiry is made as to whether the express bus is free. If so, at step 608 the information is transferred to the express bus. If the express bus is not free, however, the system proceeds to step 610 where a wait time is determined, the wait time being the amount of time the system must wait for access to the express bus.

As described in this example, the wait time is an absolute time period. Alternatively, the system can maintain wait time statistics, such that if an absolute answer is not available, the system can use an average wait time as the most likely wait time. For example, an external arbiter or processor connected to the local bus or functioning as part of the local/express bridge attached thereto can maintain this data and update this data upon each information transfer. Further, in place of averaging the wait times, other statistical techniques may be employed to obtain a weighted wait time.

A comparison is then made between the wait time and a maximum acceptable wait time at step 612. This comparison can be made, for example, in the external arbiter or processor described above. If the wait time is less than the maximum acceptable wait time, the system waits and transfers the information via the express bus as shown in step 614. If the wait time is greater than the maximum acceptable wait time, then the information is transferred to another local bus, as shown in step 616.

At step 618, an inquiry is made as to whether the target device is on the new local bus. If so, the information is transferred to the target communication device via the new local bus as shown in step 620. If not, the system returns to step 606 to inquire about the availability of the express bus. Alternatively, the system can be configured to automatically wait for the express bus as the result of a NO answer to the inquiry of step 618.

Figure 4:
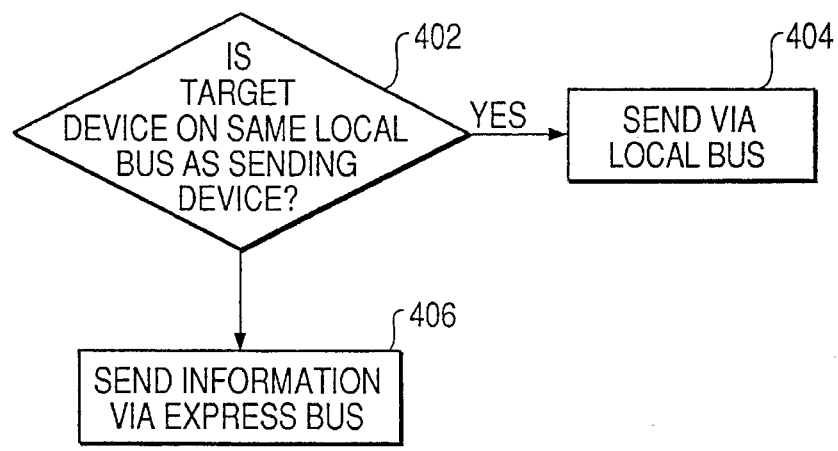
FIG. 4 shows an operational flow diagram of a first operational embodiment of the invention.

In each of the examples shown in FIGS. 4–6 and described above, it can be seen that if the target communication device is connected to the express bus, the system will eventually obtain access to the express bus and the message will thus be delivered to the target communication device.

The above examples describe use of one or more local buses in an "on ramp" situation wherein the most expeditious route of information transfer would be via the express bus, except for the fact that access to the express bus is not presently available. The local bus structure thus provides an alternative path which is not as fast as the express bus in an ideal scenario, but may be faster than the express bus given a scenario wherein the express bus is congested.

A prioritization scheme may also be incorporated into the process, wherein lower priority messages would more likely travel via the local bus path since they have a reduced likelihood of obtaining access to the express bus.

As an alternative to the "on ramp" situation described above, the local bus structure can be used in an "off ramp" situation. Here, information may be present on the express bus, but may be unable to exit the express bus onto the local bus corresponding to the target communication device. This situation can present itself if the target communication device is overloaded, the local bus corresponding to the target communication device is overloaded, or the local/express bridge leading to the local bus corresponding to the target communication device is overloaded or malfunctioning.

Using the aforementioned example, presume the information from device 202 was transferred to express bus 117 via local/express bridge 119. Thus, information is on express bus 117 for which a target communication device is communication device 210. In an ideal situation, there would be a recognition that the target communication device is on local bus 109, and the information would thus transfer via local/express bridge 123 to local bus 109 and then to communication device 210.

However, presume communication device 210 is busy, and would like the information from device 202 to be delayed. To accommodate the needs of communication device 210, the information can exit the express bus either via local/express bridge 121 to local bus 107, or via local/express bridge 125 to local bus 110. The information would then pass over a local/local bridge before appearing on local bus 109. As a result, the information is delayed in accordance with the needs of communication device 210.

Similarly, the information can be delayed in accordance with the needs of local bus 109. Perhaps, for example, a large quantity of information is passing to or from communication device 208. Thus, although target communication device 210 is free, the local bus to which it is connected, local bus 109, is currently busy with the information transfers for communication device 208. It is likely preferable for communication device 210 to receive the information after a delay rather than to miss the information completely. Therefore, the information can be delayed by exiting the express bus to a neighboring local bus, from which the information is subsequently transferred to local bus 109. Also, in a large system, delays of a larger amount of time are possible by exiting the express bus to a local bus which is further from the local bus corresponding to the target device. Therefore, the delays can be tailored to the needs of the local bus or target device.

Alternatively, presume local/express bridge 123 is overloaded or malfunctioning such that an ideal information flow is not possible. Instead of waiting for local/express bridge 123 to be available, the information can take one of the paths described above to either local bus 107 or local bus 110. As a result, although the information is delayed, it still reaches target communication device 210.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A data communication system comprising:
    an express bus;
    a plurality of local buses;
    a plurality of local/express bridges, each connecting a corresponding local bus to the express bus; and a plurality of local/local bridges, each connecting two corresponding local buses.

2. The data communication system of claim 1, wherein the plurality of local buses and the plurality of local/local bridges comprise a local path.

3. The data communication system of claim 1, further comprising a plurality of data communication devices, each data communication device being connected to an associated one of the local buses.

4. The data communication system of claim 1, further comprising a plurality of data communication devices, a first subset of the plurality of data communication devices comprising data communication devices which are each connected to an associated one of the local buses, a second subset of the plurality of data communication devices comprising data communication devices which are connected to the express bus.

5. A method of communicating information from a sending communication device to a target communication device, comprising the steps of:

a) determining if the target communication device is on a local bus corresponding to the sending communication device;

b) transferring the information from the sending communication device to the target communication device on the local bus corresponding to the sending communication device if the result of step a) is that the target communication device is on the local bus corresponding to the sending communication device;

b1) determining if an express bus is free if the result of step a) is that the target communication device is not on the local bus corresponding to the sending communication device;

b2) transferring the information from the local bus corresponding to the sending communication device to another local bus if the result of step b1) is that the express bus is not free; and c) transferring the information from the sending communication device to the express bus if the result of step b1) is that the express bus is free.

6. The method of claim 5, further comprising the steps of:

d) transferring the information from the express bus to a local bus corresponding to the target communication device if the result of step c) is that the information is transferred to the express bus; and e) transferring the information from the local bus corresponding to the target communication device to the target communication device if the result of step d) is that the information is transferred to the local bus corresponding to the target communication device.

7. The method of claim 5, further comprising the steps of:

b2a) determining if the target communication device is on the other local bus if the result of step b2) is that the information is transferred to the other local bus; and b2b) transferring the information from the other local bus to the target communication device if the result of step b2a) is that the target communication device is on the other local bus.

8. The method of claim 7, further comprising the steps of:

b2c) transferring the information from the other local bus to the express bus if the result of step b2b) is that the target communication device is not on the other local bus;

b2d) transferring the information from the express bus to a local bus corresponding to the target communication device if the result of step b2c) is that the information is transferred to the express bus; and b2e) transferring the information from the local bus corresponding to the target communication device to the target communication device if the result of step b2d) is that the information is transferred to the local bus corresponding to the target communication device.

9. A method of communicating information from a sending communication device to a target communication device, comprising the steps of:

a) determining if the target communication device is on a local bus corresponding to the sending communication device;

b) transferring the information from the sending communication device to the target communication device on the local bus corresponding to the sending communication device if the result of step a) is that the target communication device is on the local bus corresponding to the sending communication device;

b1) determining if an express bus is free if the result of step a) is that the target communication device is not on the local bus corresponding to the sending communication device;

b2) determining a wait time until the express bus will be free if the result of step b1) is that the express bus is not free;

b3) comparing the wait time determined in step b2) to a maximum acceptable wait time;

b4) transferring the information from the local bus corresponding to the sending communication device to another local bus if the result of step b3) is that the wait time exceeds the maximum acceptable wait time;

b5) delaying for the wait time and transferring the information to the express bus upon lapse of the wait time if the result of step b3) is that the wait time does not exceed the maximum wait time; and c) transferring the information from the sending communication device to the express bus if the result of step b1) is that the express bus is free.

10. The method of claim 9, further comprising the steps of:

d) transferring the information from the express bus to a local bus corresponding to the target communication device if the result of one of steps b5) and c) is that the information is transferred to the express bus; and e) transferring the information from the local bus corresponding to the target communication device to the target communication device if the result of step d) is that the information is transferred to the local bus corresponding to the target communication device.

11. The method of claim 9, further comprising the steps of:

b4a) determining if the target communication device is on the other local bus if the result of step b4) is that the information is transferred to the other local bus; and b4b) transferring the information from the other local bus to the target communication device if the result of step b4a) is that the target communication device is on the other local bus.

\* \* \* \* \*